United States Patent
Yamamoto

(10) Patent No.: US 7,493,039 B2
(45) Date of Patent: Feb. 17, 2009

(54) CAMERA, METHOD, AND PROGRAM FOR ENHANCED IMAGING USING CHROMATIC ABERRATION

(75) Inventor: Masao Yamamoto, Tokyo (JP)

(73) Assignee: Scalar Corporation, Tokyo (JP)

( * ) Notice: Subject to any disclaimer, the term of this patent is extended or adjusted under 35 U.S.C. 154(b) by 51 days.

(21) Appl. No.: 10/567,847

(22) PCT Filed: Aug. 13, 2004

(86) PCT No.: PCT/JP2004/011943

§ 371 (c)(1),
(2), (4) Date: Feb. 10, 2006

(87) PCT Pub. No.: WO2005/018236

PCT Pub. Date: Feb. 24, 2005

(65) Prior Publication Data

US 2006/0257141 A1    Nov. 16, 2006

(30) Foreign Application Priority Data

Aug. 13, 2003 (JP) .............................. 2003-293258

(51) Int. Cl.
    *G02B 21/00* (2006.01)
(52) U.S. Cl. .................. 396/430; 396/432; 396/287; 348/79; 348/80; 348/272
(58) Field of Classification Search ............ 396/439, 396/247, 432, 257, 430, 287; 348/272–283, 348/340, 342, 79, 80; 359/363
See application file for complete search history.

(56) References Cited

U.S. PATENT DOCUMENTS

| 6,917,421 B1 * | 7/2005 | Wihl et al. ............... 356/237.5 |
| 7,046,288 B1 * | 5/2006 | Finlayson ................... 348/342 |
| 2003/0095328 A1 * | 5/2003 | Boehm et al. ............... 359/388 |

FOREIGN PATENT DOCUMENTS

| JP | 08-032978 | * | 2/1996 |
| JP | 2003-018609 | | 1/2003 |

OTHER PUBLICATIONS

English Language Abstracts of JP 08-032978 and 2003-018609.
European Search Report dated Oct. 13, 2006.

* cited by examiner

*Primary Examiner*—Diane I Lee
*Assistant Examiner*—Chia-how Michael Liu
(74) *Attorney, Agent, or Firm*—Michael Bednarek; Paul, Hastings, Janofsky & Walker LLP

(57) ABSTRACT

A camera that is able to capture images of moving subjects as video images, that has a large depth of field and is thus able to capture images of thick objects, and that is able to capture images of living cells and tissues as well as tissues in water. One example includes an image pickup element and an objective lens disposed between the image pickup element and a subject. A photosensitive surface of the image pickup element has elements sensitive to light in the red, green, and blue spectral regions. Using chromatic aberration of the objective lens to form an image, the respective elements sensitive to light from the red, green and blue spectral region, collect light from respective surface segments XR, XG, and XB that lie at different heights in the subject. The images taken by the respective elements are imaged individually and produced on a monitor.

13 Claims, 8 Drawing Sheets

CAMERA, METHOD, AND PROGRAM FOR ENHANCED IMAGING USING CHROMATIC ABERRATION

TECHNICAL FIELD

The present invention relates to a camera with, for example, CCD (charge coupled device) or other image pickup means that works using the photoelectric effect and, more specifically, to a technique that can be applied to cameras, such as microscopes, suitable for high magnification imaging.

BACKGROUND OF THE INVENTION

There are different types of high magnification cameras. Taking microscopes as an example, there are generally three different types: optical microscopes, electron microscopes, and laser microscopes.

Optical microscopes provide the advantage of being able to capture images of moving objects, such as living cells and tissues, as real time video images.

However, optical microscopes have a limited depth of field. Thus, subjects, such as tissues, must be cut into very thin slices before taking pictures in optical microscopes, which involves great efforts before use. All such efforts often end up in failure of capturing images of thick objects, proving that it is difficult to obtain information in 3D.

Electron microscopes provide the advantage of very high resolution.

However, electron microscopes have the limitation of not being able to looking at living cells and tissues as well as tissues in water. They have a narrow application.

Laser microscopes provide the advantages of having a large depth of field and being able to capture images of thick objects.

However, laser microscopes are not able to capture images of moving objects as video images because an image is formed by scanning a subject with using a laser beam.

In fact, the optical microscopes, the electron microscopes, and the laser microscopes have advantages and disadvantages. It is thus necessary to use them flexibly as the application demands.

An object of the present invention is to provide a camera in which problems of such cameras are solved, that is, a camera that is able to capture images of moving subjects as video images, that has a large depth of field and is thus able to capture images of thick objects, and that is able to capture images of living cells and tissues as well as tissues in water.

SUMMARY OF THE INVENTION

The present inventor proposes the following invention.

The present inventor first proposes the following camera.

The camera according to the present invention is based on a camera comprising: an objective lens where an imaging light enters; and image pickup means that receives the imaging light directed after being passed through said objective lens to form an image, the image pickup means having a photosensitive surface, the photosensitive surface having different kinds of elements arranged in an array that are for generating predetermined signals in response to light in different wavelengths.

The objective lens of this camera is adapted to receive imaging lights from each of a plurality of subject surface segments located at different depths from said photosensitive surface and form an image on said photosensitive surface using chromatic aberration, each of the imaging lights having wavelength identical to one of said different wavelengths and being different from each other.

This camera has advantages as follows.

First, this camera is based on a principle of capturing images similar to the one that the optical microscopes, out of the aforementioned three types of microscopes, are based on. Therefore, unlike the electron microscopes, the camera can be used to look at living cells and tissues as well as tissues in water. In addition, unlike the laser microscopes, the camera is able to capture images of moving objects as video images.

Furthermore, in the camera, imaging lights in different wavelengths are received, from each of virtual subject surface segments located at different depths, by the aforementioned different kinds of elements in the image pickup means having a photosensitive surface, the photosensitive surface having different kinds of elements arranged in an array that are for generating predetermined signals in response to light in different wavelengths, to form an image. The different kinds of elements are used to form images of subject surface segments located at different depths. More specifically, this camera uses chromatic aberration which is usually the target of avoidance to achieve a large depth of field. The camera of the present invention having a large depth of field with the aforementioned configuration is closer to optical microscopes but can provide a large depth of field unlike the conventional optical microscopes, which allows it to capture images of thick objects.

The capability of capturing images as video images is one of the advantages of the camera, it may be used to capture images as still images. That is, the camera is able to capture images as either or both of the video images and still images.

The camera of the present invention may be as follows that comprises image processing means.

The camera in this case is based on a camera comprising: an objective lens where an imaging light enters; image pickup means having a photosensitive surface that receives the imaging light directed after being passed through said objective lens to form an image, the photosensitive surface having different kinds of elements arranged in an array that are for generating predetermined signals in response to light in different wavelengths; and image processing means for generating image data that are used to produce, on a predetermined display, an image taken by said image pickup means according to received said signal to send them to the outside.

The objective lens of this camera is adapted to receive imaging lights from each of a plurality of subject surface segments located at different depths from said photosensitive surface and form an image on said photosensitive surface using chromatic aberration, each of the imaging lights having wavelength identical to one of said different wavelengths and being different from each other.

The image processing means of this camera is adapted to generate, according to said signal generated by said different kinds of elements, image data with which the same number of a plurality of images produced by the same kind of said elements are provided as the number of said elements.

This camera comprises the image processing means that generates the image data as described above. Therefore, a plurality of images produced by the same kind of the elements can conveniently be produced on the display as the number of the elements merely by connecting the camera to the predetermined display.

The camera may or may not be connected to the predetermined display in use. The aforementioned image processing means may directly supply the aforementioned generated image data to the predetermined display or may first supply them to a predetermined recording medium provided inside or outside the camera and then record them thereon. In the latter case, according to the image data recorded on the recording medium, an image similar to the one directly supplied from the image processing means may be produced on the predetermined display.

As described above, a specific configuration of the image processing means is not defined as long as it generates, according to said signal received from the image pickup means, the image data with which the image taken by said image pickup means is produced on the predetermined image and sends them to the outside, or generates, according to said signal, the image data with which the same number of a plurality of images produced by the same kind of said elements are provided as the number of said elements.

The image that is finally produced on the display according to the image data generated by the image processing means may be a plurality of images in which the aforementioned plurality of images are separated, or may be a single image obtained by, for example, synthesizing the aforementioned plurality of images.

The image processing means in the former case may be adapted to generate said image data with which said plurality of images generated by the same kind of said elements can be produced as separated images on the predetermined display. This allows production of the images of a subject located at different depths individually on the display. The image processing means in this case may be adapted to generate said image data with which all of said plurality of images generated by the same kind of said elements can be produced at the same time on the predetermined display. Alternatively, it may be adapted to generate said image data with which either of said plurality of images generated by the same kind of said elements can be selectively produced on the predetermined display. In this case, a viewer who looks at the image reproduces a three dimensional image in the mind.

The image processing means in the latter case may be, for example, adapted to generate said image data with which a single image that is formed according to said plurality of images generated by the same kind of said elements can be produced on the predetermined display. In this case, the image produced on the predetermined display represents an object with a three dimensional thickness.

The camera of the present invention may be as follows.

The camera in this case is based on a camera comprising: an objective lens where an imaging light enters; image pickup means having a photosensitive surface that receives the imaging light directed after being passed through said objective lens to form an image, the photosensitive surface having different kinds of elements arranged in an array that are for generating predetermined signals in response to light in different wavelengths; and image processing means for generating image data that are used to produce, on a predetermined display, an image taken by said image pickup means according to received said signal to send them to the outside.

The objective lens of this camera is adapted to receive imaging lights expected to be captured, the imaging lights being from each of a plurality of subject surface segments located at different depths from said objective lens, each of the imaging lights having one wavelength of said different wavelengths and being different from each other, to form an image on said photosensitive surface using chromatic aberration.

The image processing means of this camera is adapted to generate, according to said signal generated by said different kinds of elements, said image data with which images in colors of only the same hue or achromatic images can be produced on a predetermined display. In this case, the image produced on the predetermined display represents an object with a three dimensional thickness.

In addition, the present inventor proposes the following image processor.

The image processor is used in combination with a camera comprising: an objective lens where an imaging light enters; image pickup means having a photosensitive surface that receives the imaging light directed after being passed through said objective lens to form an image, the photosensitive surface having different kinds of elements arranged in an array that are for generating predetermined signals in response to light in different wavelengths; and output means that sends, to the outside, received said signal, said objective lens being adapted to receive imaging lights from each of a plurality of subject surface segments located at different depths from said photosensitive surface and form an image on said photosensitive surface using chromatic aberration, each of the imaging lights having wavelength identical to one of said different wavelengths and being different from each other. It is adapted to provide the control to produce, on a predetermined display, an image according to said signal received from the output means of the aforementioned camera.

Specifically, this image processor comprises means for receiving said signal; processing means for generating, according to received said signal, image data with which the same number of a plurality of images produced by the same kind of said elements can be produced on said display as the number of said elements; and means for sending, to the ouside, generated said image data to said display means.

The image processor has a function equivalent to that of the aforementioned image processing means that may be included in the camera according to the present invention. The image processor is equivalent to the image processing removed from the camera.

The image processor may directly receive the aforementioned image data generated by the camera or may receive them through the predetermined recording medium.

The processing means in this image processor may be adapted to generate said image data with which said plurality of images generated by the same kind of said elements can be produced as separate images on said display. The processing means in this may be adapted to generate said image data with which all of said plurality of images generated by the same kind of said elements can be produced at the same time on said display. Alternatively, it may be adapted to allow selective production of either of said plurality of images generated by the same kind of said elements.

In addition, the processing means in the image processor may be adapted to generate said image data with which a single image generated according to said plurality of images generated by the same kind of said elements can be produced on the predetermined display. The processing means in this case may be adapted to generate, according to said signal generated by said different kinds of elements, said image data with which images in colors of only the same hue or images in only achromatic colors can be produced on said display.

Said processing means may be adapted to allow production of an image on said display, the image being generated by overlapping said plurality of images generated by the same kind of said elements. In addition, said processing means is adapted to allow production of an image on said display, the image being generated by converting said plurality of images generated by the same kind of said elements and then overlapping them.

Effects of the image processor as described above may also be obtained when a predetermined computer carries out the following method.

The method is, for example, an image data processing method to be carried out in an image processor having a computer, the image processor being used in combination with a camera comprising: an objective lens where an imaging light enters; image pickup means having a photosensitive surface that receives the imaging light directed after being passed through said objective lens to form an image, the photosensitive surface having different kinds of elements arranged in an array that are for generating predetermined signals in response to light in different wavelengths; and output means that sends, to the outside, received said signal, said objective lens being adapted to receive imaging lights from each of a plurality of subject surface segments located at different depths from said photosensitive surface and form an image on said photosensitive surface using chromatic aberration, each of the imaging lights having wavelength identical to one of said different wavelengths and being different from each other, the image processor being adapted to provide the control to produce, on a predetermined display, an image according to said signal received from said output means.

This method comprises steps carried out by computer; a step of receiving said signal; a step of generating, according to received said signal, image data with which the same number of a plurality of images produced by the same kind of said elements can be produced on said display as the number of said elements; and a step of sending, to the outside, generated said image data to said display means.

Effects of the image processor as described above may also be obtained when a program as follows is used.

The program is, for example, a computer-readable program used in combination with an image processor having a computer, the image processor being used in combination with a camera comprising: an objective lens where an imaging light enters; image pickup means having a photosensitive surface that receives the imaging light directed after being passed through said objective lens to form an image, the photosensitive surface having different kinds of elements arranged in an array that are for generating predetermined signals in response to light in different wavelengths; and output means that sends, to the outside, received said signal, said objective lens being adapted to receive imaging lights from each of a plurality of subject surface segments located at different depths from said photosensitive surface and form an image on said photosensitive surface using chromatic aberration, each of the imaging lights having wavelength identical to one of said different wavelengths and being different from each other, the image processor being adapted to provide the control to produce, on a predetermined display, an image according to said signal received from said output means, the computer-readable program being for carrying out, by said computer.

The processing carried out by the computer with this program includes at least a processing of receiving said signal; a processing of generating, according to received said signal, image data with which the same number of a plurality of images produced by the same kind of said elements can be produced on said display as the number of said elements; and a processing of sending, to the outside, generated said image data to said display means.

Said plurality of subject surface segments in the present invention may be separated from their adjacent subject surface segment at a generally equal distance. With such subject surface segments, the plurality of images obtained by the different kinds of elements provide images at different depths separated from each other at a generally equal distance. A viewer who looks at the resulting image can grasp the thickness of the subject more easily.

Said plurality of subject surface segments in the present invention are separated from their adjacent subject surface segment at a distance not larger than the depth of field of said objective lens. The resulting different kinds of images obtained by the different kinds of elements are all in focus.

The different kinds of elements are three kinds of elements: the element that is sensitive to the light in the red spectral region, the element that is sensitive to the light in the green spectral region, and the element that is sensitive to the light in the blue spectral region. Said plurality of subject surface segments are three kinds of subject surface segments in which each of the light in the red spectral region therefrom, the light in the green spectral region therefrom, and the light in the blue spectral region therefrom is focused through said objective lens to form an image on said photosensitive surface. This may be achieved by using, for example, an ordinary CCD.

BEST MODE FOR CARRYING OUT THE INVENTION

Figure 1:
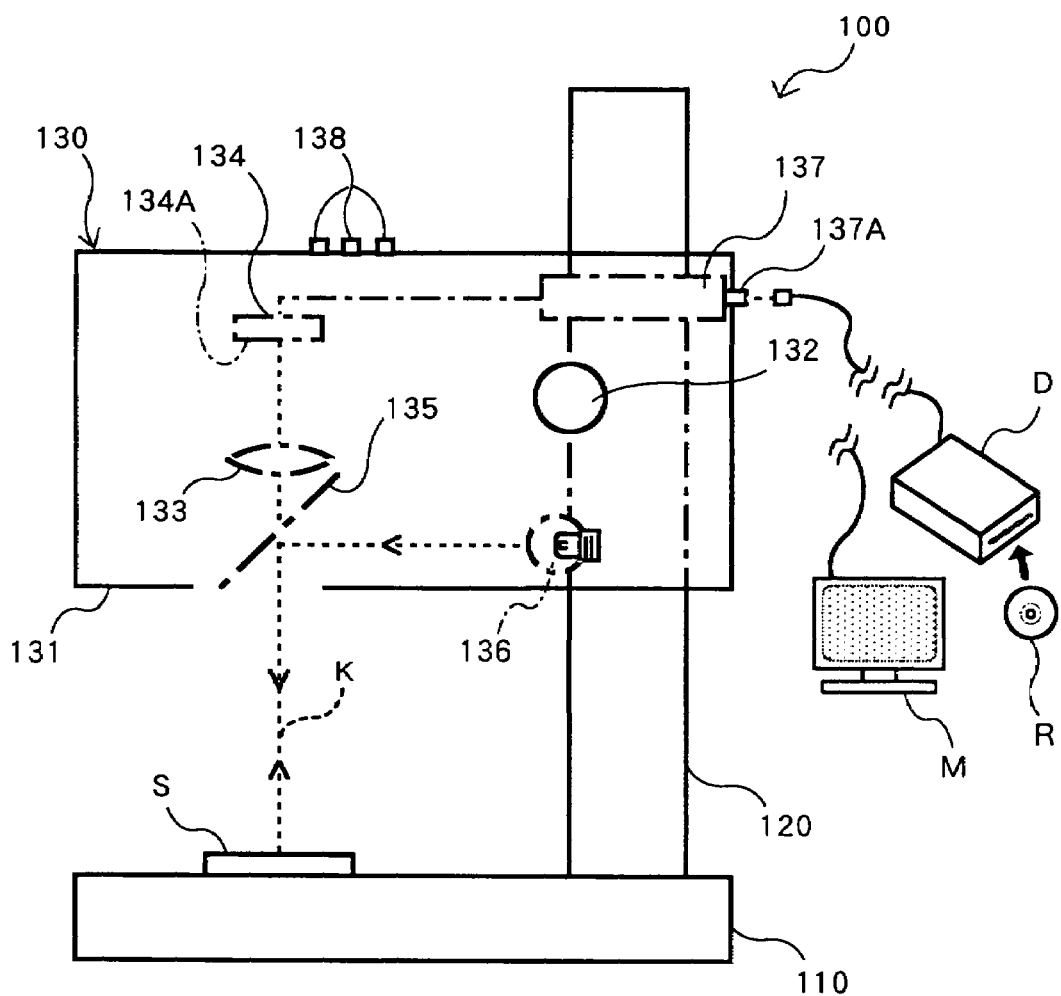
FIG. 1 is a side view including a partially perspective view of a camera according to a first embodiment of the present invention.

Referring to the drawing, first and second preferred embodiments of the present invention are described below. It should be noted that components shared with the embodiments are designated with the same reference numbers, and will not be repeatedly described.

First Embodiment

A camera 100 according to this embodiment is configured as shown in the side view (including a partially perspective view) shown in FIG. 1.

The camera 100 according to this embodiment comprises a mount 110, a column 120, and a camera body 130.

The mount 110 is a place on which a subject S is placed at a predetermined position. The mount 110 has a certain weight to stabilize the whole camera 100 in order to allow the camera 100 to stably take images.

The column 120 extends vertically from the top surface of the mount 110. The column 120 is for supporting the camera body 130 at varying distances from the top surface of the mount 110. The column 120 may be made of, for example, a metal and is like a rod with a rectangular cross section in this embodiment.

The camera body 130 has a casing 131 in which and on which various components and parts are provided.

The casing 131 is generally rectangular solid shape and has openings formed in the top and bottom surfaces thereof that correspond to the cross-sectional shape of the column 120. The camera body 130 is supported on the column 120 with the column 120 passed through the openings formed in the casing 131.

The camera body 130 is movable along the length of the column 120 and can be positioned at a desired position. A knob 132 is provided on a side of the casing 131. When being rotated in an appropriate direction, it allows the camera body 130 to be moved up and down. A mechanism for the up-and-down movement and the fixing of the camera body 130 may be based on any mechanism that is used in a similar portion of an ordinary microscope, and a specific configuration thereof is not considered.

The casing 131 contains an objective lens 133, an image pickup element 134, a half mirror 135, a light source 136, and a circuit board 137.

The objective lens 133 is where the imaging light from a subject S enters. The objective lens 133 may be a combination of a plurality of lenses. A single lens is used as the objective lens 133 in the camera 100 of this embodiment.

The image pickup element 134 corresponds to the image pickup means in the present invention. It is for taking an image using the imaging light directed through the objective lens 133. The image pickup element 134 in this embodiment is embodied as a CCD and has a photosensitive surface 134A that serves to take images. The photosensitive surface 134A has different kinds of elements arranged in an array that are for generating predetermined signals in response to light in different wavelengths. The different kinds of elements of the image pickup element 134 in this embodiment are the following three elements, but not limited thereto: an element that is sensitive to the light in the red spectral region, an element that is sensitive to the light in the green spectral region, and an element that is sensitive to the light in the blue spectral region.

The aforementioned objective lens 133 receives imaging lights from a plurality of subject surface segments located at different depths from the photosensitive surface 134A and forms an image on the photosensitive surface 134A. Now, the imaging lights from individual subject surface segments include light components in various wavelengths. Only the imaging lights in wavelengths each of which is identical to one of the different wavelengths at which an image is formed by the different kinds of elements arranged on the photosensitive surface 134A and which are different from each other, are selectively focused on the photosensitive surface 134A. This selective image formation is achieved by using chromatic aberration of the objective lens 133, which is described in detail later.

The light source 136 is something which produces illumination light required for taking images with the image pickup element 134. The light source 136 in this embodiment is the one, but not limited thereto, which produces light including at least the light in the red spectral region, the light in the green spectral region, and the light in the blue spectral region. The light source 136 in this embodiment may be a small incandescent lamp.

The half mirror 135 is something which directs the illumination light from the light source 136 to the subject S along the same optical path as the one that the imaging light transmitted from the subject S to the image pickup element 134 travels. In other words, the illumination light that exits the light source 136 is reflected from the half mirror 135 and irradiated onto the subject S. It should be noted that the half mirror 135 is angled at 45 degrees away from the optical path along which the imaging light propagating from the subject S to the photosensitive surface 134A described later travels.

The imaging light from the subject S passes through the half mirror 135 and enters the objective lens 133, and then is directed to the image pickup element 134.

The circuit board 137 is for providing the control to send, to the outside, image data that are generated according to the signals produced by the individual elements when the image pickup element 134 receives the directed imaging light and takes an image, in which the image data can be used to display the image on a predetermined display. In order to make it possible, the circuit board 137 is connected to the image pickup element 134 and has an output terminal 137A for the output of the image data. The output terminal 137A is connected to an external device by wire through a predetermined cable or by wireless through, for example, infrared communication. Examples of the external device include a monitor M and a drive D for storing the image data on a predetermined recording medium R. The image data transmitted through the output terminal 137A produce an image described below on a predetermined monitor M that receives the image data. The same applies to the case where the image data are supplied to the monitor M through the recording medium R.

The circuit board 137 in this embodiment can, but not limited thereto, provide desired processing of the signal received from the image pickup element 134. In such a case, an image based on the processed image data is produced on the monitor M that has received the image data through the output terminal 137A.

The aforementioned processing carried out in the camera 100 in this embodiment may be, but not limited thereto, a set of different types of processing. The camera 100 allows the user to choose a desired type of processing by using a knob 138 provided on the top surface of the casing 131.

The circuit board 137 is not illustrated because it is general. It comprises at least a CPU (Central Processing Unit), a ROM (Read Only Memory), a RAM (Random Access Memory), and an interface, which are connected to each other through a bus not shown.

The CPU is a central processing unit that control the camera as a whole. The ROM records the program(s) required for the aforementioned control. The CPU is designed to carry out the processing based on the program(s). The RAM provides the working area for the camera to carry out the program(s). The interface is connected to the output terminal 137A and the control knob 138. It transmits, to the CPU, the information generated when the control knob 138 is used. It also sends the image data processed by the CPU to the output terminal 137A.

The aforementioned processing of the image data and the control of the external output are achieved when the CPU carries out the aforementioned program(s).

How the camera 100 is used is described below.

In order to take an image with the camera 100, the subject S is placed on the mount 110 at a predetermined position. Then, the knob 132 is used to move the camera body 130 in the up-and-down direction in FIG. 1. The camera body 130 is fixed at an appropriate position where the subject S is in focus.

The illumination light produced from the light source 136 is reflected from the half mirror 135 and is irradiated onto the subject S.

The illumination light is reflected from the half mirror 135 and is directed to the subject S. The illumination light is reflected from the subject S as the imaging light. The imaging light reflected from the subject S passes through the half mirror 135 and the objective lens 133 to form an image on the photosensitive surface 134A on the image pickup element 134. Thus, the image of the subject S is taken by the image pickup element 134.

The arrow designated on the optical path shown by a broken line in FIG. 1 indicates the direction that the illumination light or the imaging light propagates along the optical path.

The imaging mechanism of this camera 100 is described in detail with reference to FIGS. 2 to 6.

Figure 2:
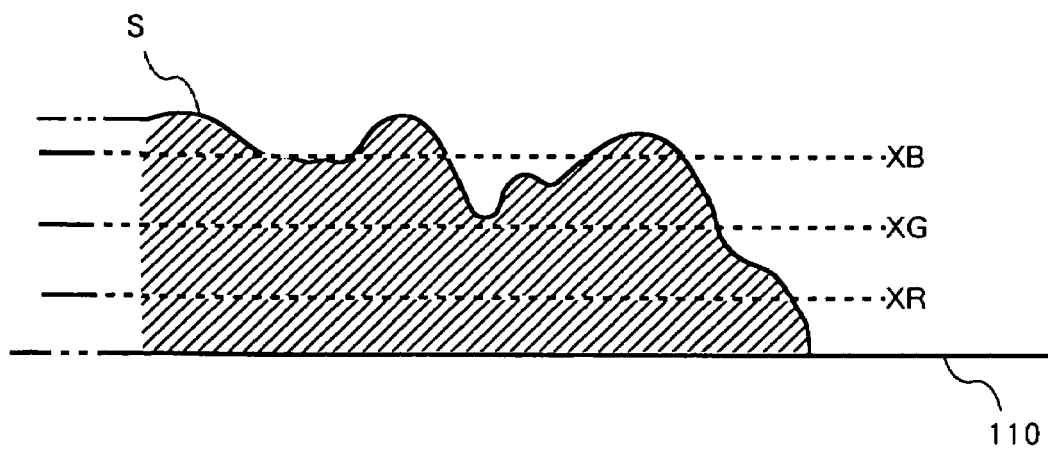
FIG. 2 is an enlarged cross-sectional view of an subject the image of which is to be taken with the camera shown in FIG. 1.

FIG. 2 is an enlarged view of a section of the subject S taken along the plane parallel to the optical axis K.

In the figures, XR, XG, and XB represent subject surface segments. Each of the subject surface segments XR, XG, and XB are located at different depths from the photosensitive surface 134A. In addition, in this embodiment, the subject surface segments XR, XG, and XB are separated from their adjacent subject surface segment at an equal distance. More specifically, in this embodiment, the distance between the subject surface segment XR and the subject surface segment XG is identical to the distance between the subject surface segment XG and the subject surface segment XB. In addition, in the subject surface segment XR, XG, and XB in this embodiment, the distance between the adjacent subject surface segments is not larger than the depth of field of the objective lens 133.

How the light from each of the subject surface segments XR, XG, and XB behaves is described. The wavelengths of the light reflected from the subject surface segments XR, XG, and XB to form an image depend on the wavelengths of the light components included in the illumination light. It includes various spectral regions. However, only how the following three different lights behave is described herein for the purpose of simplifying the description: the light in the red spectral region LR, the light in the green spectral region LG, and the light in the blue spectral region LB. FIGS. 3 to 6 are used for this description. In each drawing in FIGS. 3 to 6, the light in the red spectral region is represented by LR, the light in the green spectral region is represented by LG, and the light in the blue spectral region is represented by LB. The objective lens is denoted by 133, and the half mirror 135 is not illustrated.

Figure 3:
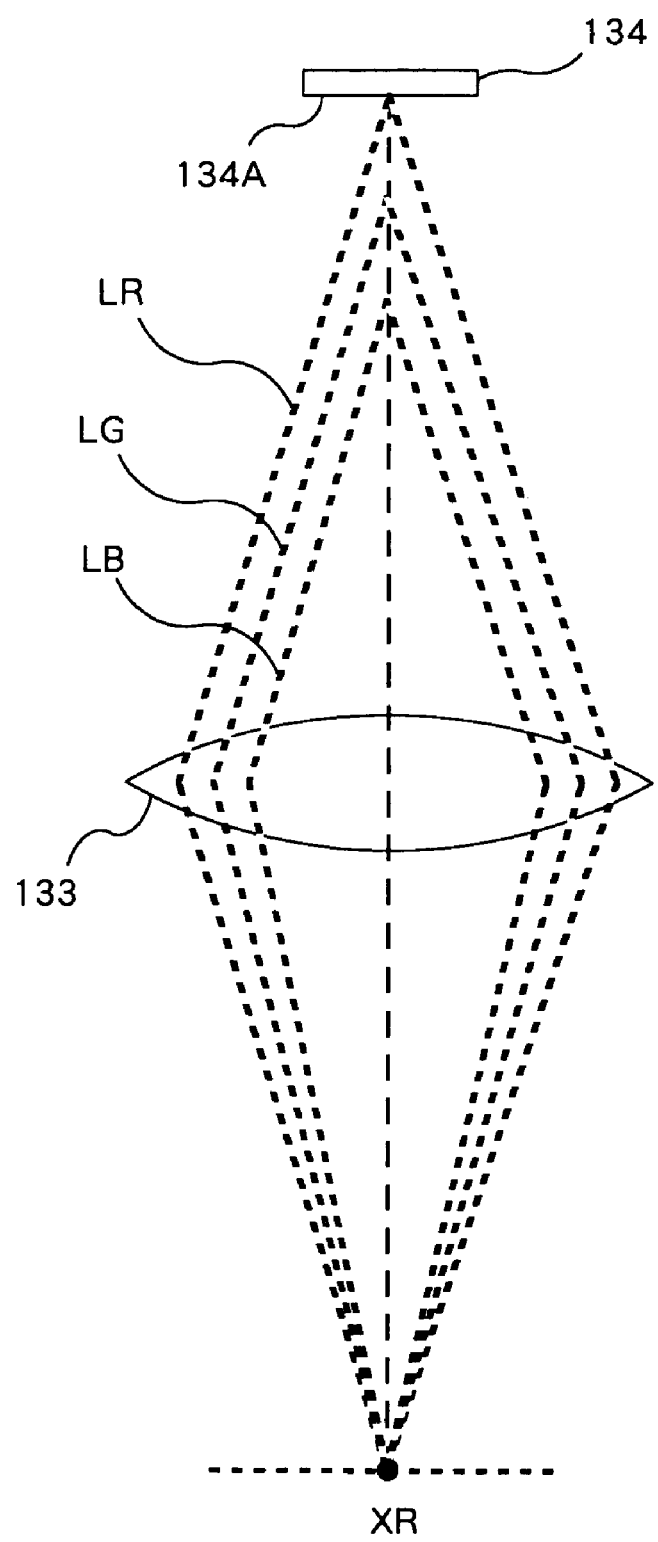
FIG. 3 is a view showing the paths that the light in the red spectral region travels in the camera shown in FIG. 1.

First, how the light reflected from the subject surface segment XR behaves is described with reference to FIG. 3.

Although the subject surface segment XR reflects the light including various spectral regions, described are only the following three different spectral regions as described above: the light in the red spectral region LR, the light in the green spectral region LG, and the light in the blue spectral region LB.

The light in the red spectral region LR reflected from the subject surface segment XR is focused to form an image on the photosensitive surface 134A of the image pickup element 134. The light in the green spectral region LG and the light in the blue spectral region LB are focused to form an image in front of the photosensitive surface 134A. This is because of the chromatic aberration of the objective lens 133.

Therefore, the light in the red spectral region LR is the only component of the light reflected from the subject surface segment XR that is focused to form an image on the photosensitive surface 134A.

Figure 4:
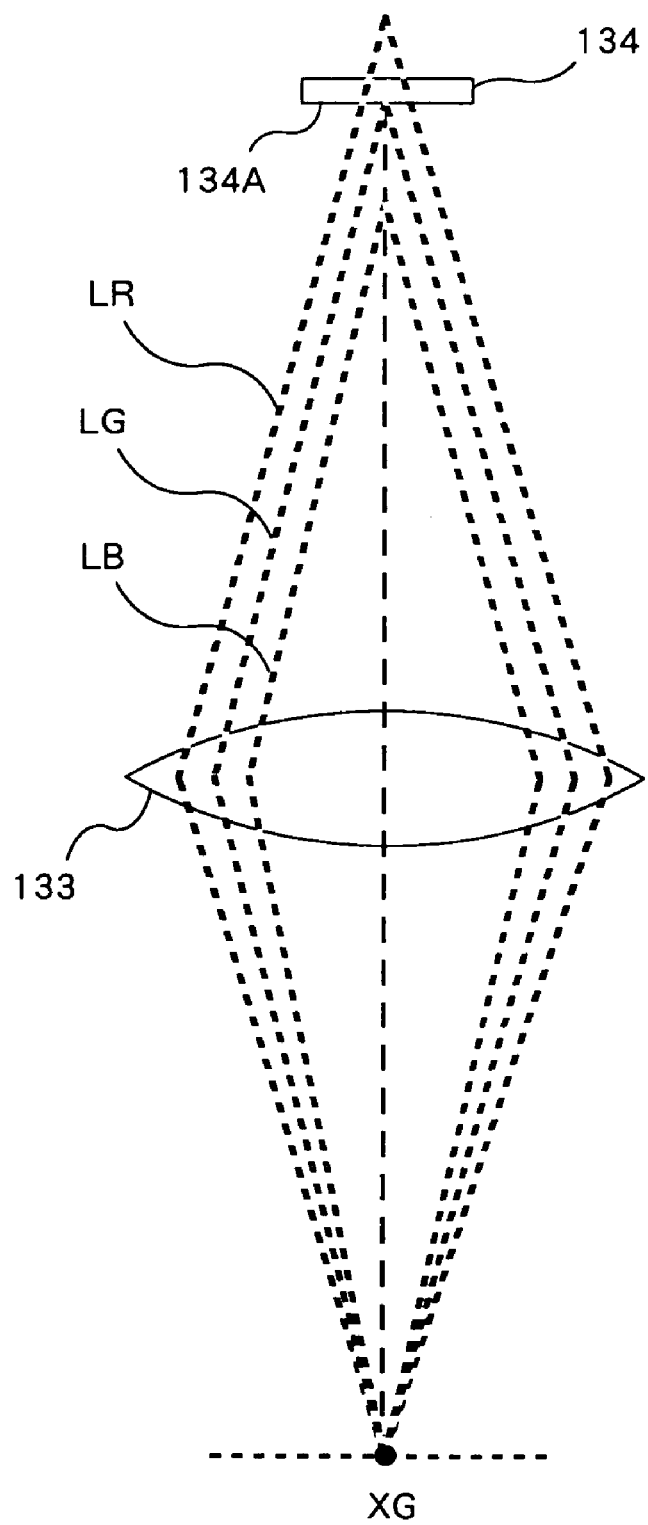
FIG. 4 is a view showing the paths that the light in the green spectral region travels in the camera shown in FIG. 1.

Next, how the light reflected from the subject surface segment XG behaves is described with reference to FIG. 4.

The light in the red spectral region LR reflected from the subject surface segment XG is focused to form an image behind the photosensitive surface 134A of the image pickup element 134. The light in the green spectral region LG is focused to form an image on the photosensitive surface 134A. The light in the blue spectral region LB is focused to form an image in front of the photosensitive surface 134A. This is also because of the chromatic aberration of the objective lens 133.

Therefore, the light in the green spectral region LG is the only component of the light reflected from the subject surface segment XG that is focused to form an image on the photosensitive surface 134A.

Figure 5:
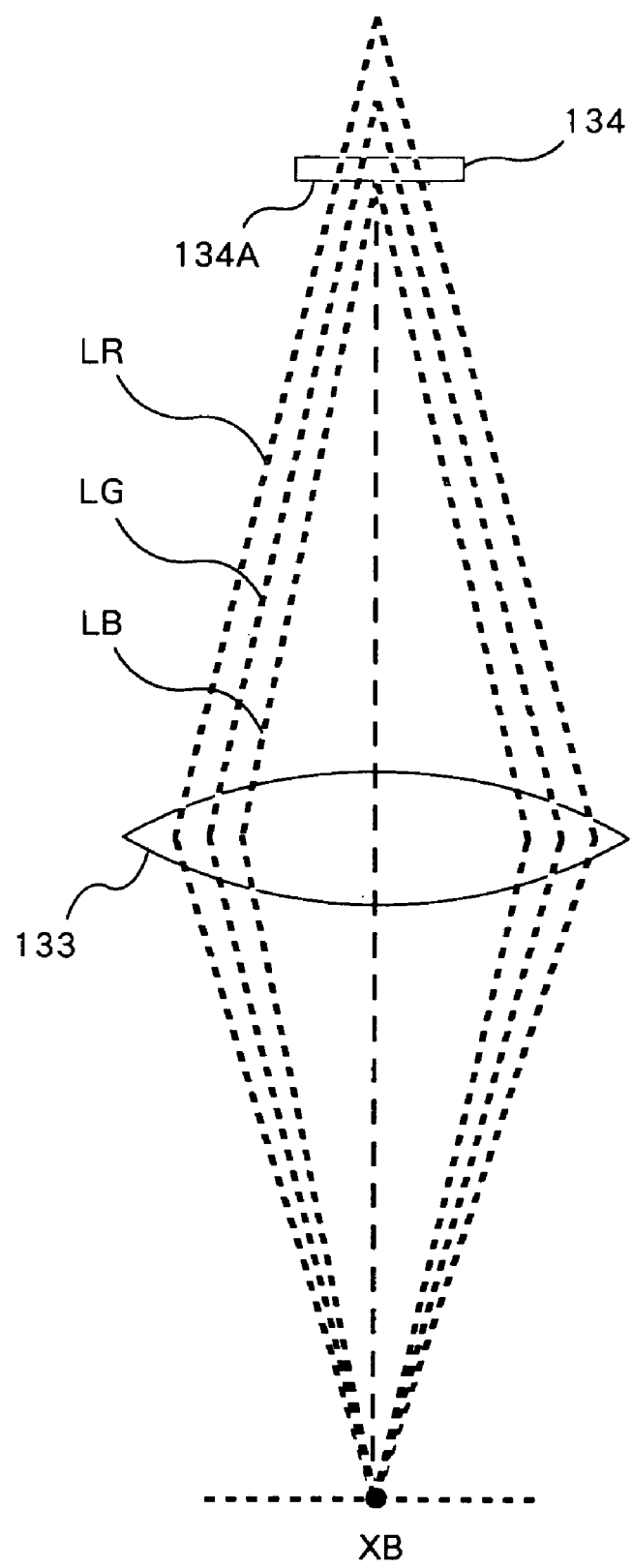
FIG. 5 is a view showing the paths that the light in the blue spectral region travels in the camera shown in FIG. 1.

Next, how the light reflected from the subject surface segment XB behaves is described with reference to FIG. 5.

The light in the red spectral region LR and the light in the green spectral region LG reflected from the subject surface segment XB are focused to form an image behind the photosensitive surface 134A of the image pickup element 134. The light in the blue spectral region LB is focused to form an image on the photosensitive surface 134A. This is also because of the chromatic aberration of the objective lens 133.

Therefore, the light in the blue spectral region LB is the only component of the light reflected from the subject surface segment XB that is focused to form an image on the photosensitive surface 134A.

Figure 6:
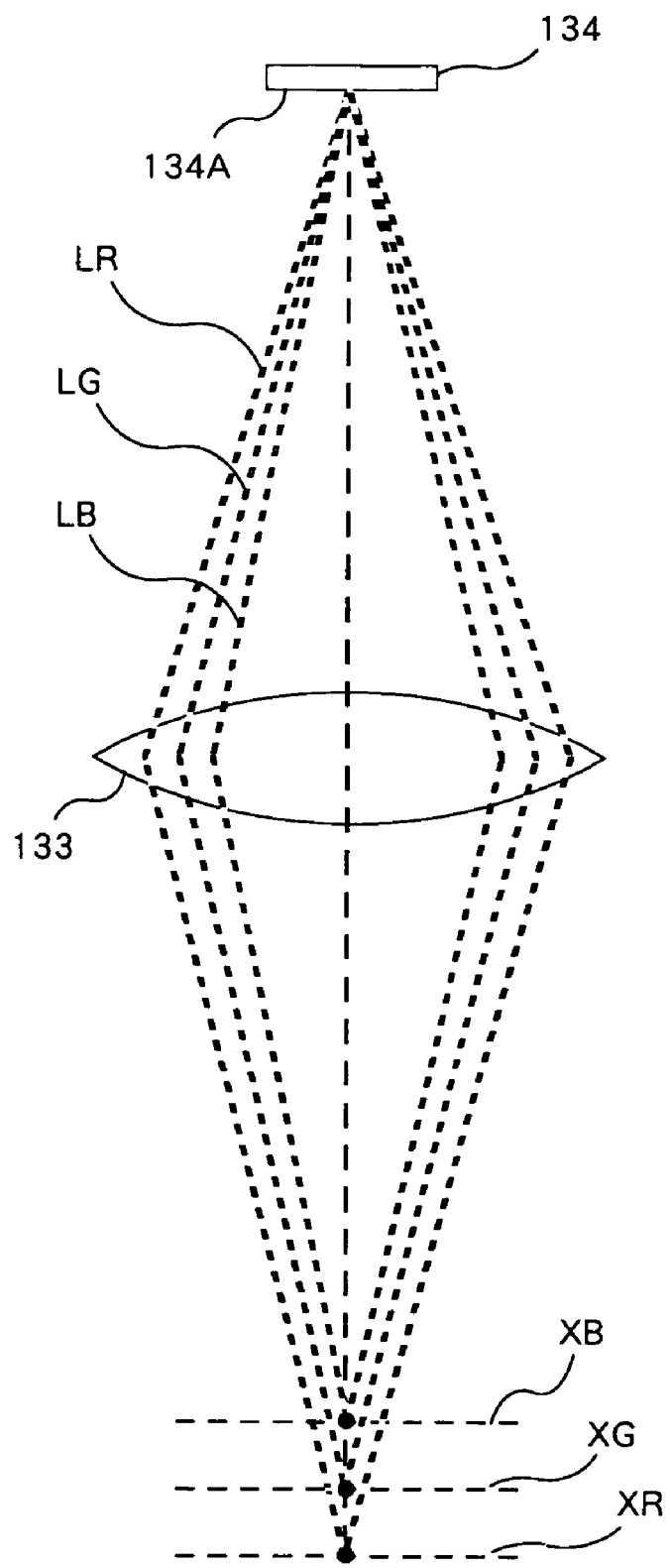
FIG. 6 is a view showing the paths that the light received by the camera shown in FIG. 1 to form an image travels.

As a result, as shown in FIG. 6, on the photosensitive surface 134A of the image pickup element 134, only the light in the red spectral region LR reflected from the subject surface segment XR, the light in the green spectral region LG reflected from the subject surface segment XG, and the light in the blue spectral region LB reflected from the subject surface segment XB are focused to form an image.

As described above, the photosensitive surface 134A of the image pickup element 134 in this embodiment includes the element that is sensitive to the light in the red spectral region, the element that is sensitive to the light in the green spectral region, and the element that is sensitive to the light in the blue spectral region.

Therefore, when the image pickup element 134 receives the light from the subject S as described above to form an image, the element that is sensitive to the light in the red spectral region receives the light in the red spectral region LR reflected from the subject surface segment XR, the element that is sensitive to the light in the green spectral region receives the light in the green spectral region LG reflected from the subject surface segment XG, and the element that is sensitive to the light in the blue spectral region receives the light in the blue spectral region LB reflected from the subject surface segment XB, to form an image.

In other words, in the image pickup element 134, the element that is sensitive to the light in the red spectral region takes an image of the subject surface segment XR, the element that is sensitive to the light in the green spectral region takes an image of the subject surface segment XG, and the element that is sensitive to the light in the blue spectral region takes an image of the subject surface segment XB.

An image signal associated with the image taken with the image pickup element 134 is supplied to the circuit board 137. The circuit board 137 generates, according to the image signal, image data with which the same number of images produced by the same kind of elements are provided as the number of the elements. More specifically, in this embodiment, the circuit board 137 generates image data with which the following three kinds of images can be displayed on the monitor M: the image of the subject surface segment XR taken by the element that is sensitive to the light in the red spectral region in response to the light in the red spectral region, the image of the subject surface segment XG taken by the element that is sensitive to the light in the green spectral region in response to the light in the green spectral region, and the image of the subject surface segment XB taken by the element that is sensitive to the light in the blue spectral region in response to the light in the blue spectral region.

The image data are transmitted from the circuit board 137 to the output terminal 137A. The image data supplied to the output terminal 137A are then transmitted to the external device that is connected to the output terminal 137A. The image data may be subjected to processing in the circuit board 137 depending on the choice of an observer.

For example, when the monitor M is connected, the image based on the image data is displayed on the monitor M.

When a drive D is connected, the image data are recorded on the recording medium R loaded thereon. The image data are read out of the recording medium R by using certain means and supplied to a predetermined monitor, thereby an image similar to the one obtained when the image data are directly supplied from the output terminal 137A to that monitor.

Figure 7A:
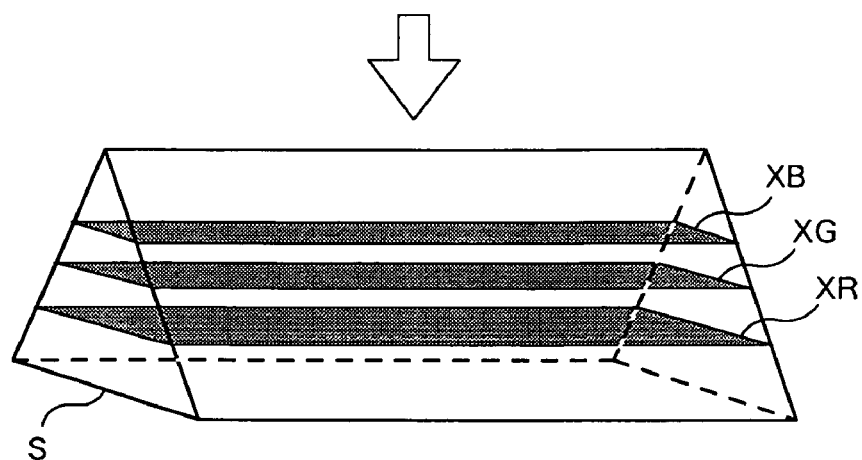
FIG. 7A is a view showing an example of a subject the image of which is taken with the camera shown in FIG. 1.

An example of the image produced on the monitor M is described with reference to FIGS. 7A and 7B. FIG. 7A is a view showing the relation between the subject S and the subject surface segments XR, XG, and XB. An image is taken in the direction depicted by the arrow in FIG. 7A.

Figure 7B:
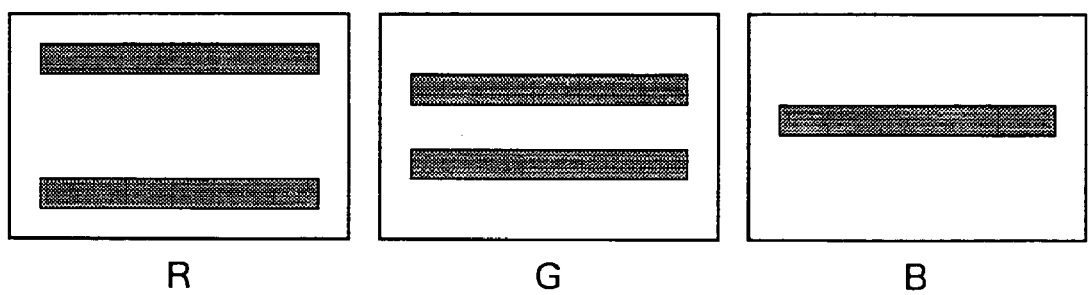
FIG. 7B is a view showing an example of an image taken with the camera shown in FIG. 1.

In this case, the image produced on the monitor M is as shown in FIG. 7B. In FIG. 7B, what is depicted by R represents the image of the subject surface segment XR taken by the element that is sensitive to the light in the red spectral region in response to the light in the light in the red spectral region, what is depicted by G represents the image of the subject surface segment XG taken by the element that is sensitive to the light in the green spectral region in response to the light in the green spectral region, and what is depicted by B represents the image of the subject surface segment XB taken by the element that is sensitive to the light in the blue spectral region in response to the light in the blue spectral region.

It should be noted that the images represented by R, G, and B, respectively, are produced on the monitor M at the same time in this embodiment, but one of them may be selectively produced on the monitor M by using the control knob 138 provided on the camera body 130. Alternatively, two of them may be produced on the monitor M. In this embodiment, the observer can imagine the shape of the original subject S by combining the aforementioned three images in the mind. In addition, when the observer can choose the image produced on the monitor M, he or she can view an image of the desired subject surface segment XR, XG or XB by making such a choice.

The images represented by R, G, and B are to be displayed in red, green, and blue, respectively, and it is easy to do so. However, all of the images represented by R, G and B may be displayed in colors of the same hue. Alternatively, they may be displayed achromatically. In these cases, the circuit board 137 generates such image data. The choice of the color may be allowed to be done by using the control knob 138.

Another example of an image produced on the monitor M is described with reference to FIG. 8.

Figure 8:
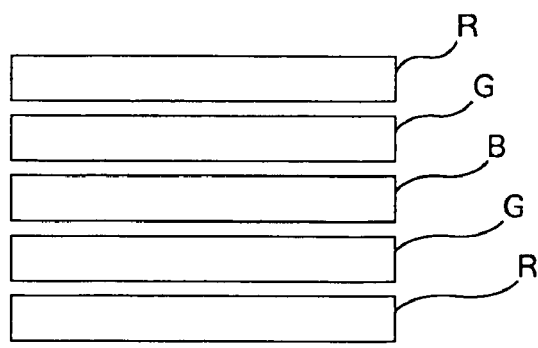
FIG. 8 is a view showing an example of an image taken with the camera shown in FIG. 1.

The image shown in FIG. 8 is a combined image synthesized from the three images represented by R, G, and B in FIG. 7B. The symbol R in FIG. 8 corresponds to an imaging segment of the subject S included in the image represented by R in FIG. 7B. The symbol G in FIG. 8 corresponds to an imaging segment of the subject S included in the image represented by G in FIG. 7B. The symbol B in FIG. 8 corresponds to an imaging segment of the subject S included in the image represented by B in FIG. 7B. The synthesis in this embodiment is a mere combination of the imaging segments.

An observer who looks at the imaging segments as shown in FIG. 8 can intuitively grasp the subject S shown in FIG. 7A without combining them in the mind.

Under such a circumstance, the images represented by R, G, and B are also to be displayed in red, green, and blue, respectively, and it is easy to do so. However, all of them may be displayed in colors of the same hue. Alternatively, they may be displayed in achromatic color. That will give the user a better view of the image. In these cases, the circuit board 137 generates such image data. The choice of the color may be allowed to be done by using the control knob 138.

Second Embodiment

A camera according to the second embodiment is configured basically in a similar manner to the camera 100 according to the first embodiment shown in FIG. 1.

The camera according to the second embodiment comprises a mount 110, a column 120, and a camera body 130, as in the camera 100 according to the first embodiment.

The mount 110 and the column 120 included in the camera according to the second embodiment is similar in structure to the mount 110 and the column 120 included in the camera 100 according to the first embodiment. The camera body 130 included in the camera according to the second embodiment is basically identical in structure to the camera body 130 included in the camera 100 according to the first embodiment.

The camera body 130 according to the second embodiment has a casing 131 that is similar to the one included in the camera body 130 according to the first embodiment. The casing 131 has a knob 132, an objective lens 133, an image pickup element 134, a half mirror 135, a light source 136, and a circuit board 137. This is also the same as the camera according to the first embodiment.

The difference of the camera according to the second embodiment from the camera 100 according to the first embodiment lies in the circuit board 137. The circuit board 137 according to the second embodiment merely has a function to send, to the outside, through an output terminal 137A, image data that are generated according to the signals produced by the individual elements contained in the image pickup element 134 when the image pickup element 134 takes an image. The image data sent to the outside in the second embodiment are different from the image data produced through the circuit board 137 according to the first embodiment. They may be the data that cannot be used to display the image on a predetermined display. In addition, the circuit board 137 of the camera according to the second embodiment does not provide any processing of the image signal as described above.

Figure 9:
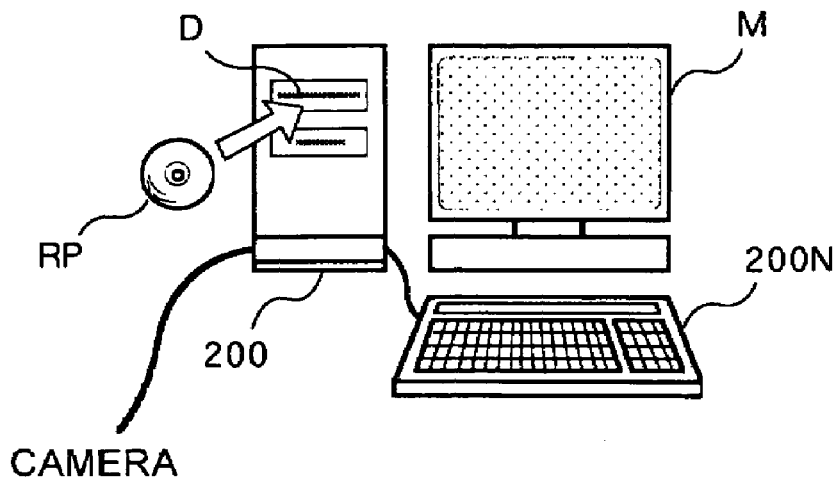
FIG. 9 is a view showing an image processor that is used in combination with a camera according to a second embodiment.

The camera according to the second embodiment is combined with an image processor 200 as shown in FIG. 9.

The image processor 200 is connected to the camera by wire or by wireless and has a function of providing a predetermined image processing of the image signal received from the camera.

The image processor 200 may be implemented using a computer. In this embodiment, the image processor 200 is implemented using a general-purpose personal computer.

Figure 10:
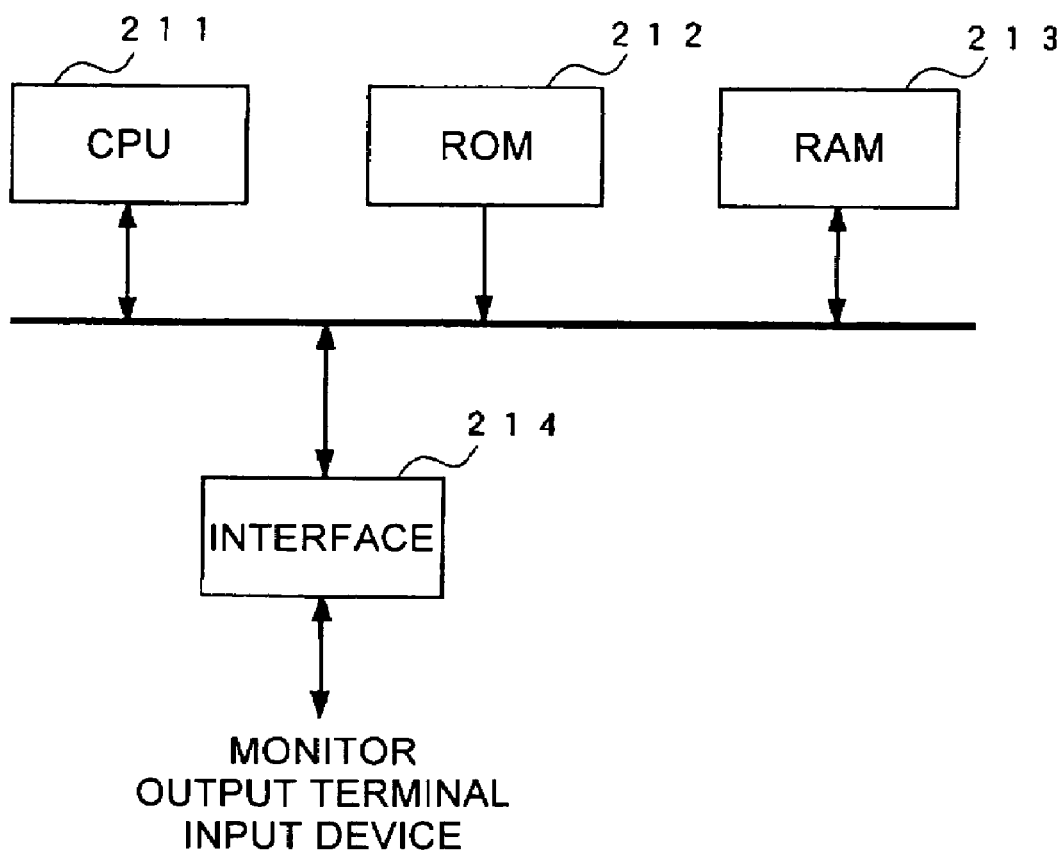
FIG. 10 is a view showing a hardware configuration in the image processor shown in FIG. 9.

The image processor 200 includes, as shown in FIG. 10, a CPU (Central Processing Unit) 211, a ROM (Read Only Memory) 212, a RAM (Random Access Memory) 213, and an interface 214. The ROM 212, the RAM 213, and the interface 214 are connected to the CPU 211 through a bus.

The CPU 211 is for carrying out a predetermined processing by executing a predetermined program. The ROM 212 records a program used to operate the CPU 211 such as a program required for carrying out the processing to produce an image on a monitor M described above. The RAM 213 provides the working area for the CPU 211 to carry out the processing. The interface 214 serves as a connection circuit for input into and output from the CPU 211. The aforementioned monitor M and the output terminal 137A of the camera are connected to the CPU 211 through the interface 214. An image signal from the camera is supplied to the CPU 211 through the interface 214. The image data generated by the CPU 211 are supplied to the monitor M through the interface 214. The image processor 200 in this embodiment comprises an input device 200N implemented by a keyboard or a mouse. An input therefrom is transmitted to the CPU 211 also through the interface 214.

The image processor 200 has a drive D. A recording medium RP can be inserted into the drive D to load the program according to the present invention that is recorded on the recording medium RP. The computer provides the functions required for the image processor 200 of the present invention when the aforementioned program according to the present invention is installed into it. It should be noted that the aforementioned program may be installed into the computer through something other than the recording medium RP. For example, it may be installed into the computer through distribution via a network.

The program may alone be sufficient to make the computer function as the image processor 200 of the present invention. Alternatively, it may be cooperated with an OS (Operating System) or other program that has previously been installed on the computer to make the computer function as the image processor 200 of the present invention.

The following functional block is provided within the image processor 200 when the aforementioned program is executed.

Figure 11:
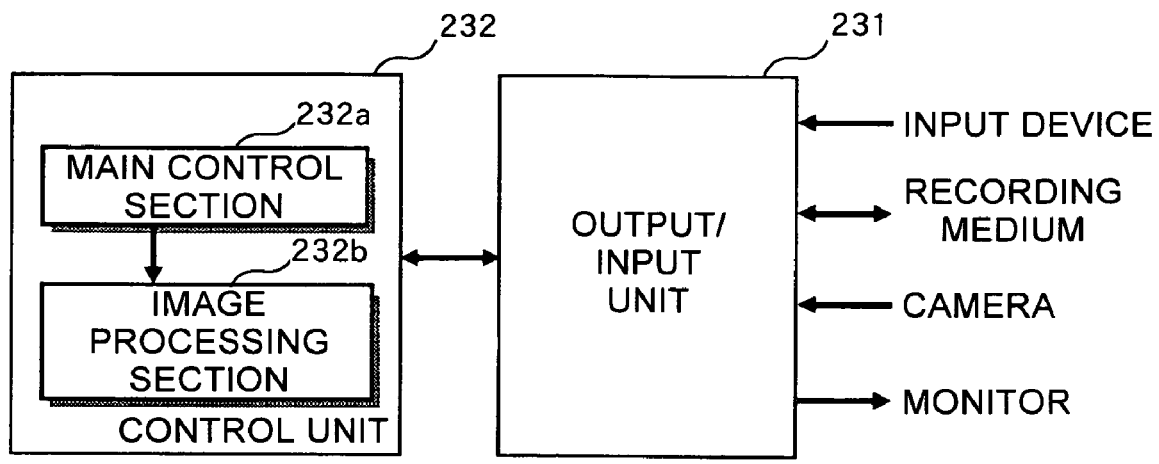
FIG. 11 is a block diagram showing a functional block that is generated within the image processor shown in FIG. 9.

The functional block is illustrated in FIG. 11.

Within the image processor 200, an output/input unit 231 and a control unit 232 are generated.

The output/input unit 231 has a function of receiving the information supplied from the input device 200N, the image data supplied from the recording medium RP, or the image signal supplied from the camera as well as a function of sending the image data received from the control unit 232 to the recording medium RP and the monitor M.

The control unit 232 controls the entire image processor 200. The control unit 232 comprises a main control section 232a and an image processing section 232b.

The main control section 232a is for controlling the image processing section 232b and the output/input unit 231.

The image processing section 232b is for providing image processing of the image signal received from the camera through the output/input unit 231. This processing is performed according to an instruction of the input device 200N that is received through the output/input unit 231.

How the camera according to the second embodiment is used is described below.

In order to take an image with this camera, the subject S is placed on the mount 110 at a predetermined position. Then, the knob 132 is used to move the camera body 130 in the up-and-down direction in FIG. 1. The camera body 130 is fixed at an appropriate position where the subject S is in focus.

The illumination light produced from the light source 136 is reflected from the half mirror 135, directed to the subject S, and reflected from the subject S. This light passes through the half mirror 135 and the objective lens 133 to form an image on the photosensitive surface 134A of the image pickup element 134. Thus, the image of the subject S is taken by the image pickup element 134.

In the photosensitive surface 134A of the image pickup element 134, as in the case of the camera according to the first embodiment, the element that is sensitive to the light in the red spectral region receives the light in the red spectral region LR reflected from the subject surface segment XR, the element that is sensitive to the light in the green spectral region receives the light in the green spectral region LG reflected from the subject surface segment XG, and the element that is sensitive to the light in the blue spectral region receives the light in the blue spectral region LB reflected from the subject surface segment XB, to form an image.

Figure 12:
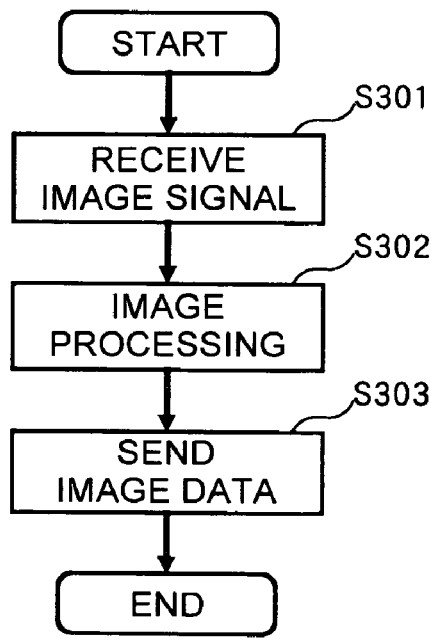
FIG. 12 is a flow diagram showing a flow of processes that are carried out in the image processor shown in FIG. 9.

As shown in FIG. 12, the image signal obtained by the image pickup element 134 is supplied to the image processor 200 through the output terminal 137A under the control of the circuit board 137 (S301).

The image signal is transmitted to the control unit 232 through the output/input unit 231. The image processing section 232b that has received the image signal provides predetermined image processing depending on the input from the input device 200N under the control of the main control section 232a to generate image data generated based on the aforementioned image signal (S302).

Subsequently, the main control section 232a supplies the image data to the output/input unit 231. The output/input unit 231 supplies the image data to either the drive D or the monitor M according to an instruction from the main control section 232a depending on the input from the input device 200N (S303).

When the image data are supplied to the monitor M, then the image based on the image data is produced on the monitor M.

When the image data are supplied to the drive D, the image data are recorded on the recording medium RP loaded thereon. The image data are read by the drive D and then transmitted to the monitor M through the output/input unit 231, which makes it possible to produce, on the monitor M, an image similar to the one obtained when the image data are directly supplied from the output terminal 137A to that monitor M. The data may be read from the recording medium RP by using certain means to produce an image similar to that on another monitor.

Images that can be produced on the monitor M by using the camera of the second embodiment vary as in the case of the images to be displayed with the camera 100 of the first embodiment. The image processing section 232b is adapted to generate image data that are used to produce such various images.

The invention claimed is:

1. A camera comprising: an objective lens where an imaging light enters; image pickup means having a photosensitive surface that receives the imaging light directed after being passed through said objective lens to form an image, the photosensitive surface having different kinds of elements arranged in an array that are for generating predetermined signals in response to imaging light in different wavelengths; and image processing means for generating image data that are used to produce, on a predetermined display, an image taken by said image pickup means according to received said predetermined signals to send them to the outside, said objective lens being adapted to receive imaging lights from each of a plurality of subject surface segments located at different depths from said photosensitive surface and form an image on said photosensitive surface using chromatic aberration, while said photosensitive surface is positioned at a fixed distance with respect to a sample that produces the imaging light, each of the imaging lights having a wavelength identical to one of said different wavelengths and being different from each other, said image processing means being adapted to generate, according to said predetermined signals generated by said different kinds of elements, said image data with which achromatic images can be produced on the predetermined display.

2. A camera comprising: an objective lens where an imaging light enters; and image pickup means that receives the imaging light directed after being passed through said objective lens to form an image, the image pickup means having a photosensitive surface, the photosensitive surface having different kinds of elements arranged in an array that are for generating predetermined signals in response to imaging light in different wavelengths, said objective lens being adapted to receive imaging lights from each of a plurality of subject surface segments located at different depths from said photosensitive surface and form an image on said photosensitive surface using chromatic aberration, each of the imaging lights having a wavelength identical to one of said different wavelengths and being different from each other, wherein said plurality of subject surface segments are separated from their adjacent subject surface segments at a generally equal distance.

3. A camera comprising: an objective lens where an imaging light enters;

and image pickup means that receives the imaging light directed after being passed through said objective lens to form an image, the image pickup means having a photosensitive surface, the photosensitive surface having different kinds of elements arranged in an array that are for generating predetermined signals in response to imaging light in different wavelengths, said objective lens being adapted to receive imaging lights from each of a plurality of subject surface segments located at different depths from said photosensitive surface and form an image on said photosensitive surface using chromatic aberration, each of the imaging lights having a wavelength identical to one of said different wavelengths and being different from each other, wherein each subject surface segment of said plurality of subject surface segments is separated from an adjacent subject surface segment at a distance not larger than the depth of field of said objective lens.

4. A camera comprising: an objective lens where an imaging light enters; and image pickup means that receives the imaging light directed after being passed through said objective lens to form an image, the image pickup means having a photosensitive surface, the photosensitive surface having different kinds of elements arranged in an array that are for generating predetermined signals in response to imaging light in different wavelengths, said objective lens being adapted to receive imaging lights from each of a plurality of subject surface segments located at different depths from said photosensitive surface and form an image on said photosensitive surface using chromatic aberration, each of the imaging lights having a wavelength identical to one of said different wavelengths and being different from each other, wherein said different kinds of elements are the following three kinds of elements: the element that is sensitive to the light in the red spectral region, the element that is sensitive to the light in the green spectral region, and the element that is sensitive to the light in the blue spectral region, said plurality of subject surface segments are three kinds of subject surface segments in which each of the light in the red spectral region therefrom, the light in the green spectral region therefrom, and the light in the blue spectral region therefrom is focused through said objective lens to form an image on said photosensitive surface.

5. An image processor that is used in combination with a camera, the camera comprising: an objective lens where an imaging light enters; image pickup means having a photosensitive surface that receives the imaging light directed after being passed through said objective lens to form an image, the photosensitive surface having different kinds of elements arranged in an array that are for generating predetermined signals in response to imaging light in different wavelengths; and output means that sends, to the outside, received said predetermined signals, said objective lens being adapted to receive imaging lights from each of a plurality of subject surface segments located at different depths from said photosensitive surface and form an image on said photosensitive surface using chromatic aberration, while said photosensitive surface is positioned at a fixed distance with respect to a sample that produces the imaging light, each of the imaging lights having a wavelength identical to one of said different wavelengths and being different from each other, the image processor being adapted to provide the control to produce, on a predetermined display, an image according to said signal predetermined signals received from said output means, the image processor comprising: means for receiving said predetermined signals; processing means for generating, according to received said predetermined signals, image data with which a plurality of images comprising a respective image corresponding to signals received from only one kind of element of each different kind of elements can be produced on said display; and means for sending, to the outside, generated said image data to said display, wherein said processing means is adapted to generate, according to said signal generated by said different kinds of elements, said image data with which achromatic images can be produced on said display.

6. The image processor as claimed in claim 5, wherein said processing means is adapted to generate said image data with which said plurality of images can be produced as separate images on said display.

7. The image processor as claimed claim 5, wherein said processing means is adapted to allow simultaneous production of all of said plurality of images on said display.

8. The image processor as claimed in claim 5, wherein said processing means is adapted to allow selective production of any of said plurality of images.

9. The image processor as claimed in claim 5, wherein said processing means is adapted to allow production of an image on said display, the image being generated by overlapping said plurality of images.

10. The image processor as claimed in claim 5, wherein said processing means is adapted to allow production of an image on said display, the image being generated by converting said plurality of images and then overlapping the plurality of images.

11. The image processor as claimed in claim 5, wherein said processing means is adapted to generate, according to said predetermined signals generated by said different kinds of elements, said image data with which images in colors of only the same hue can be produced on said display.

12. An image data processing method to be carried out in an image processor having a computer, the image processor being used in combination with a camera, the camera comprising: an objective lens where an imaging light enters; image pickup means having a photosensitive surface that receives the imaging light directed after being passed through said objective lens to form an image, the photosensitive surface having different kinds elements arranged in an array that are for generating predetermined signals in response to imaging light in different wavelengths; and output means that sends, to the outside, received said predetermined signals, said objective lens being adapted to receive imaging lights from each of a plurality of subject surface segments located at different depths from said photosensitive surface and from an image on said photosensitive surface using chromatic aberration, while said photosensitive surface is positioned at a fixed distance with respect to a sample that produces the imaging light, each of the imaging lights having a wavelength identical to one of said different wavelengths and being different from each other, the image processor being adapted to provide the control to produce, on a predetermined display, an image according to said predetermined signals received from said output means, said image data processing method comprising below steps carried out by said computer comprising:

a step of receiving said predetermined signals;

a step of generating, according to received said predetermined signals, image data with which a plurality of images comprising a respective image corresponding to signals received from only one kind of element of each different kind of elements can be produced on said display; and a step of sending, to the outside, generated said image data to said display, wherein said image processor generates, according to said signal generated by said different kinds of elements, said image data with which achromatic images can be produced on said display.

13. A computer-readable program used in combination with an image processor having a computer, the image processor being used in combination with a camera, the camera comprising: an objective lens where an imaging light enters; image pickup means having a photosensitive surface that receives the imaging light directed after being passed through said objective tens to form an image, the photosensitive surface having different kinds of elements arranged in an array that are for generating predetermined signals in response to imaging light in different wavelengths; and output means that sends, to the outside, received said predetermined signals, said objective lens being adapted to receive imaging lights from each of a plurality of subject surface segments located at different depths from said photosensitive surface and form an image on said photosensitive surface using chromatic aberration, while said photosensitive surface is positioned at a fixed distance with respect to a sample that produces the imaging light, each of the imaging lights having wavelength identical to one of said different wavelengths and being different from each other, the image processor being adapted to provide the control to produce, on a predetermined display, an image according to said signal received from said output means, the computer-readable program being for carrying out, by said computer, at least:

a processing of receiving said predetermined signals;

a processing of generating, according to received said predetermined signals, image data with which a plurality of images comprising a respective image corresponding to signals received from only one kind of element of each different kind of elements can be produced on said display; and a processing of sending, to the outside, generated said image data to said display wherein said image processor generates, according to said signal generated by said different kinds of elements said image data with which achromatic images can be produced on said display.

* * * * *